J. H. STORTZ.
SPEED SELECTING INDICATOR.
APPLICATION FILED SEPT. 18, 1915.

1,253,745.

Patented Jan. 15, 1918.
3 SHEETS—SHEET 1.

WITNESS:

INVENTOR
John H. Stortz
BY
ATTORNEY

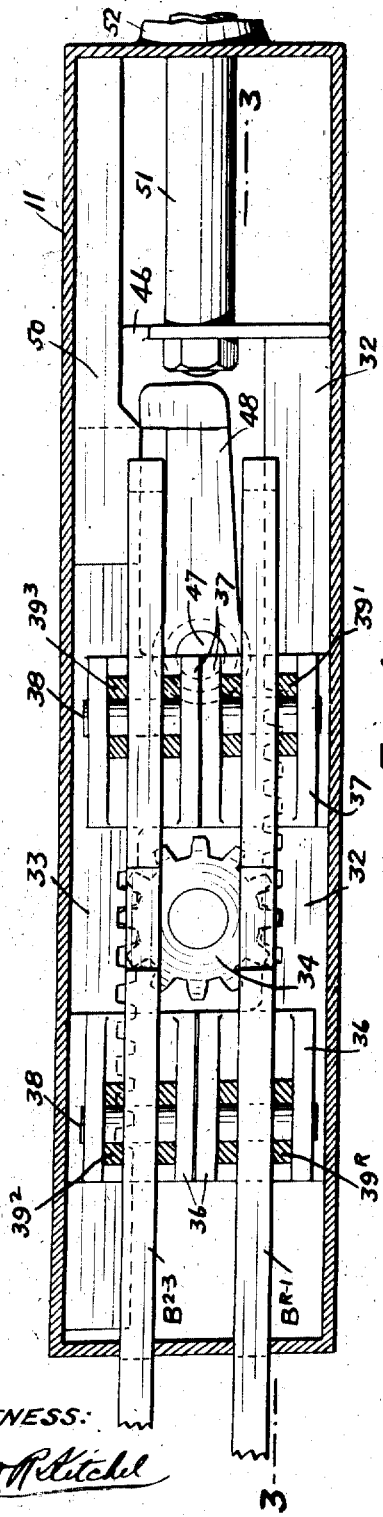
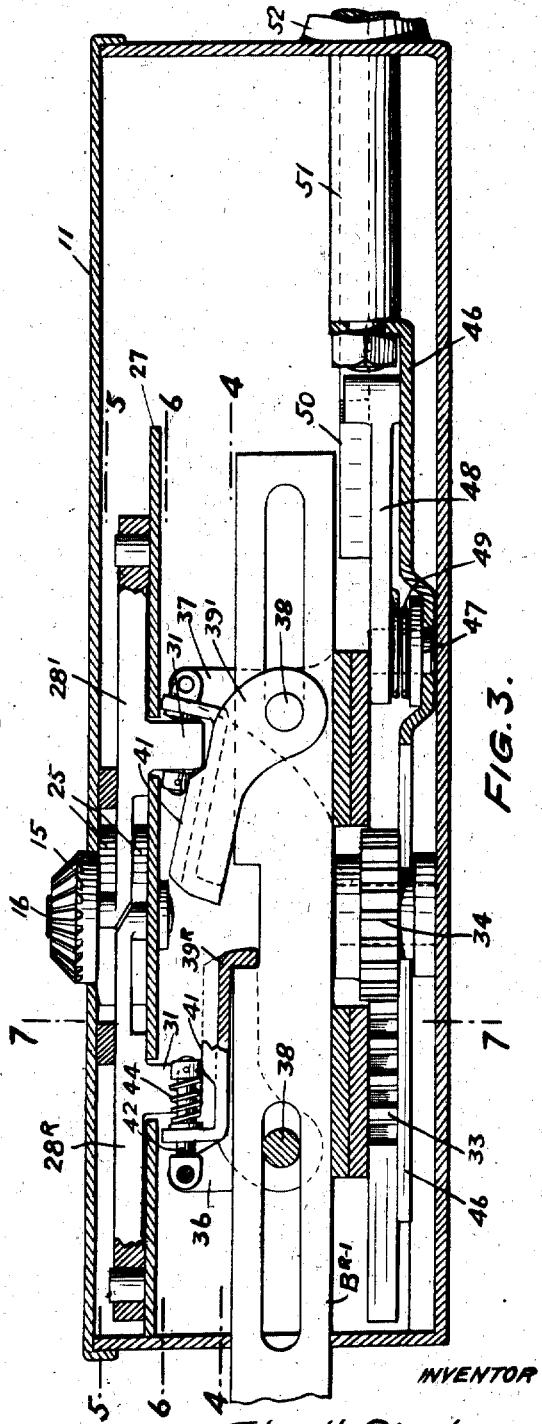

J. H. STORTZ.
SPEED SELECTING INDICATOR.
APPLICATION FILED SEPT. 18, 1915.

1,253,745.

Patented Jan. 15, 1918.
3 SHEETS—SHEET 3.

WITNESS:

INVENTOR
John H. Stortz
BY
ATTORNEY.

UNITED STATES PATENT OFFICE.

JOHN H. STORTZ, OF PHILADELPHIA, PENNSYLVANIA, ASSIGNOR TO STORTZ GEAR SHIFT COMPANY, OF WILMINGTON, DELAWARE.

SPEED-SELECTING INDICATOR.

1,253,745.     Specification of Letters Patent.     Patented Jan. 15, 1918.

Application filed September 18, 1915. Serial No. 51,398.

*To all whom it may concern:*

Be it known that I, JOHN H. STORTZ, a citizen of the United States, and a resident of Philadelphia, in the county of Philadelphia and State of Pennsylvania, have invented certain new and useful Improvements in Speed-Selecting Indicators, of which the following is a specification.

This invention relates to speed selecting devices, particularly such as are adapted for use in connection with power driven vehicles, such as automobiles.

The chief object of my present improvements is to produce a safe, simple, convenient, reliable and inexpensive device adapted to preselect the gear intended to be shifted into mesh with another gear for the purpose of transmitting the power of the driving means, such as a motor, to the driven means, such as a vehicle, the device being adapted to prevent the shifting of gears while the driving means are connected with the driven means, to prevent the shifting of one of the gears into mesh before another gear is shifted out of mesh, to indicate consecutively the neutral positions of all the gears and the speed changing positions of each gear, and to prevent the transmission of power to the driven means before a gear has been properly shifted.

The chief object is to provide a selector adapted to preselect and to indicate a change in the speed of a variable speed machine, such as an automobile, which means are controlled manually and are operated purely mechanically without the intervention of any electrical, magnetic or electro-magnetic means.

With the above and related objects in view, my present invention comprises the hereinafter described construction, combination and arrangement of parts, as illustrated in the accompanying drawings, and which are embraced within the scope of the appended claims.

Figure 1:
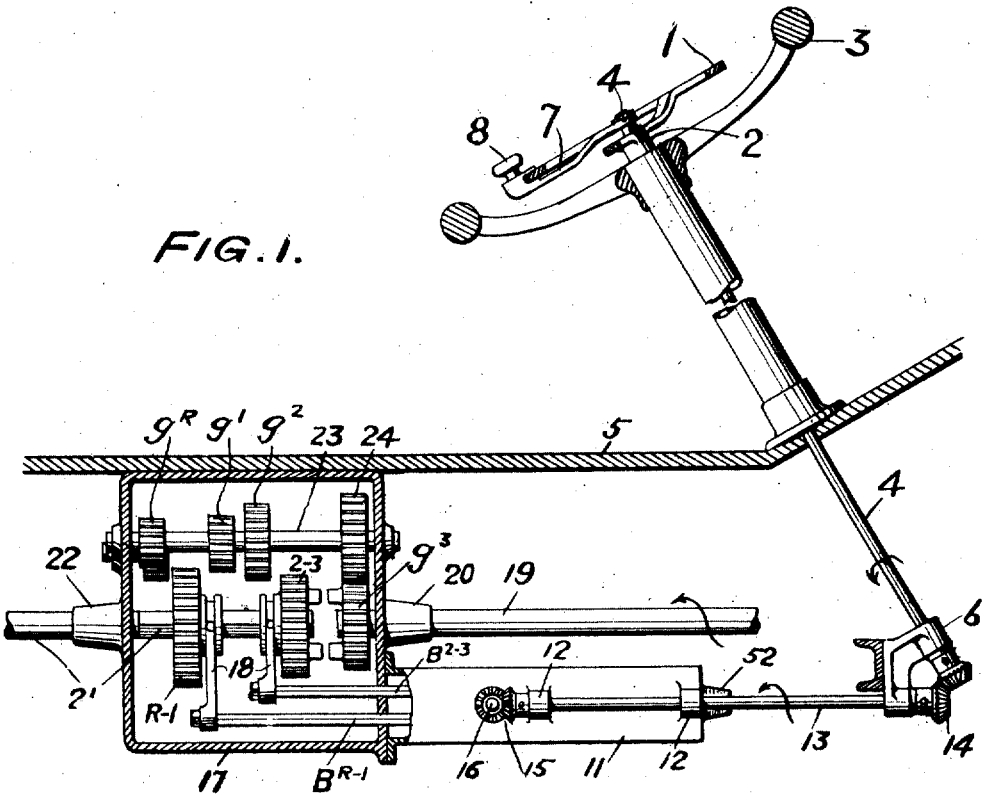
Figure 2:
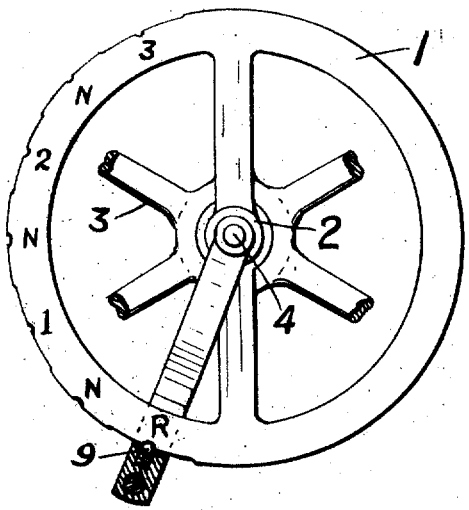
Figure 5:
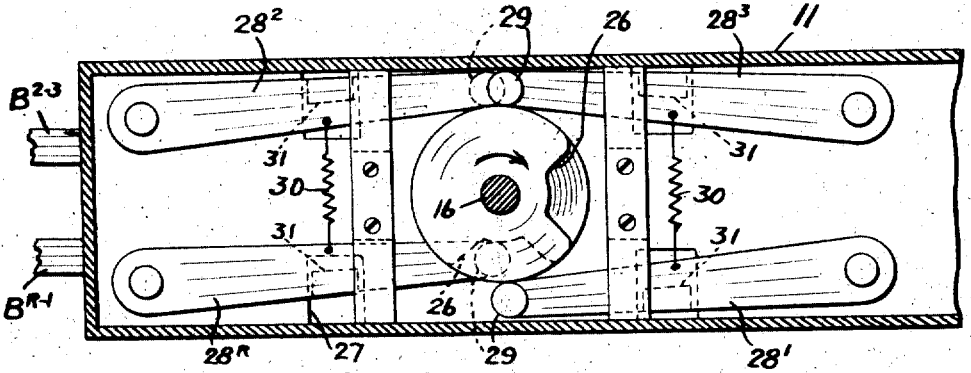
Figure 6:
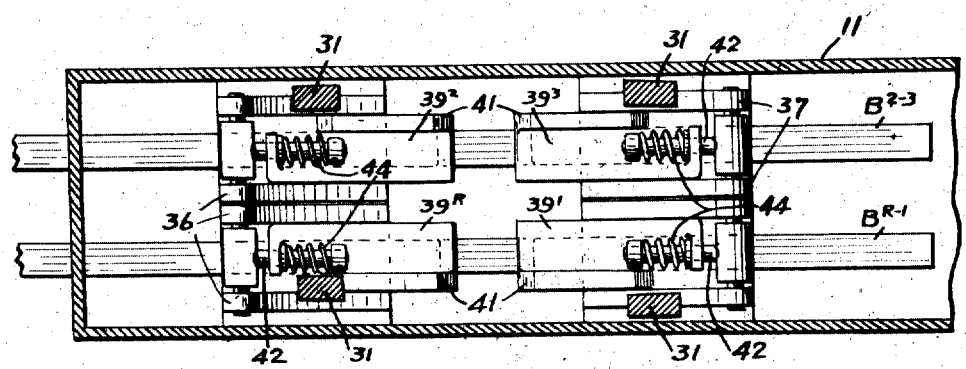
Figure 7:
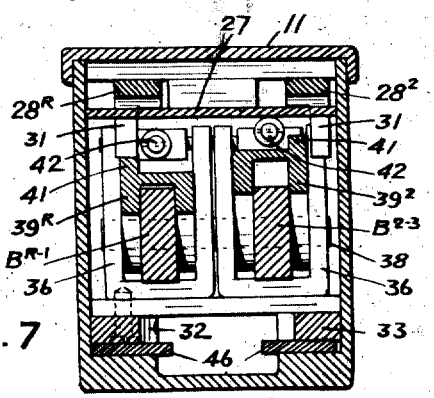

In the said drawing:—Figure 1 is a diagrammatic view of a gear box suspended from the foot board of an automobile and provided with my improved gear selector; Fig. 2 is a plan view of my improved indicator or controller; Fig. 3 is a section on the line 3—3 of Fig. 4; Fig. 4 is a section on the line 4—4 of Fig. 3; Fig. 5 is a section on the line 5—5 of Fig. 3; Fig. 6 is a section on the line 6—6 of Fig. 3, and Fig. 7 is a section on the line 7—7 of Fig. 3.

Referring more particularly to the drawing for a detail description of my invention:—1 represents a flat ring carried by a hub 2, which constitutes the bearing for the customary steering wheel 3. As shown in Fig. 2, half of the ring 1 is of uniform diameter, while the other half is provided with peripherally alternating concentric elevations and depressions, the depressed portions being centrally provided with notches marked R, 1, 2 and 3, and the elevated portions with similar notches marked N. 4 represents a shaft, shown to be projected through the hub 2 and through the foot board 5 of the vehicle, below which it is supported by a bearing of a bracket 6. On top of the shaft is mounted a crank lever 7, which is bent and extended from under the ring, or indicator 1 and at right angles with its periphery where it is provided with a handle 8 and with a spring actuated ball 9 adapted to bear against said periphery.

11 represents the selector casing, shown to be provided with bearings 12 for a shaft 13, which shaft is further supported by a bearing of the bracket 6 through which it is projected, the projecting end carrying one of a pair of bevel gears 14, the other one being mounted on the shaft 4. The opposite end of the shaft 13 carries a bevel gear in mesh with a similar gear 15 mounted on the selector shaft 16. $B^{R-1}$ and $B^{2-3}$ represent a pair of bars projecting rearwardly of the casing 11 and within the gear box 17 where each is provided with a shifter 18.

19 represents a shaft, supported by a bearing 20 of the gear box, said shaft being adapted to transmit the power of a motor (not shown) to a shaft 21 supported by a bearing 22 of the box and adapted to drive the vehicle. The portion of the shaft 21 inside the box 17 is shown to be square faced and adapted to slidingly support the gears R—1 and 2—3 which are mounted to rotate with said shaft. The gear 2—3 is provided with face teeth adapted to become interlocked with those of the gear $g^3$. The box 17 is also provided with bearings for a countershaft 23, which carries the gears $g^R$, $g^1$, $g^2$ and 24, and with a bearing for an idler shown to be in mesh with the gear $g^R$. The gear 24, which is shown to be in mesh with the gear $g^R$, is adapted to transmit the motion of the driving shaft 19 to the counter shaft 23. The idler, which is driven by the gear $g^R$, is adapted to transmit the motion of the countershaft to the driven shaft 21 when the gear R—1 is shifted to mesh with said idler in a direction opposite to that of the shaft 19 and at a reduced speed. The gear $g^1$, when the gear R—1 is shifted to mesh therewith, is adapted to transmit the motion of its countershaft to said shaft 21 in the direction of the shaft 19 but at a reduced speed. The gear $g^2$, when the gear 2—3 is shifted to mesh therewith, is adapted to transmit the motion of its countershaft to the shaft 21 in the direction of the shaft 19 at an intermediate speed. When said gear 2—3 is shifted to become interlocked with the gear $g^3$, the shaft 21 is driven in the direction and with the speed of the shaft 19.

On the shaft 16, inside the casing 11, is mounted an interlock 25, said interlock comprising a pair of disks provided with peripheral recesses 26 located as shown in Fig. 5. The casing 11 is provided with a perforated partition 27 pivotally supporting the levers $28^R$ and $28^1$ whose fulcrums are in opposite alinement and the levers $28^2$ and $28^3$ whose fulcrums are also in opposite alinement and parallel with the first above mentioned pair of levers. The levers are adapted to ride with their free ends 29 upon the peripheral surface of the interlock, each pair being yieldably connected by a spring 30. Each lever is provided with a lug 31, adapted to project through a corresponding perforation of the partition 27.

Inside the casing 11 are mounted racks 32 and 33, each rack being in mesh with a pinion 34 adapted to actuate said racks in opposite directions. The rack 32 is provided with a pair of carriers 36, and the rack 33 is provided with a similar pair of carriers 37. Each pair of carriers is joined transversely by a rod 38, the opposite ends of each rod being extended to project through the slots of the bars $B^{R-1}$ and $B^{2-3}$. On the opposite ends of each rod and spanning each bar are fulcrumed pawls provided with hooks respectively designated as $39^R$, $39^1$, $39^2$ and $39^3$. The hooks $39^R$ and $39^1$ are adapted to become respectively engaged with the opposite shoulders of the central recess of the bar $B^{R-1}$, and the hooks $39^2$ and $39^3$ are adapted to become similarly engaged with the bar $B^{2-3}$. Each pawl is provided with a ridge 41 and with a bracket opposite the ridge, which bracket is adapted to slide along the leg of a corresponding bolt 42. The leg of each bolt is pivotally supported between the brackets of a corresponding carrier adjacent to the bracket of a corresponding pawl, and upon the leg of each bolt, between its head and the pawl bracket is wound a spring 44 one end of which is connected with the head of the bolt and the opposite end with a washer adapted to bear against the bracket of the pawl.

46 represents a slide carrying a pin 47, and 48 represents a lever having one of its ends fulcrumed on said pin 47 and yieldably connected with the slide by a spring 49 wound on the pin. The lever 48 terminates in a lug adapted to be actuated by the spring 49 to yieldably bear against the cam surface of a plate 50.

The slide 46 is provided with a rectangular extension adapted to bear against the abutting end of the rack 32 and is connected with a rod 51 which is projected through a bearing 52 in front of the casing 11.

In describing the operation of my improved speed selecting indicator, it is assumed, as shown in Fig. 1, that the driven speed changing elements R—1 and 2—3 are out of mesh and disconnected from the transmitting elements $g^R$, $g^1$, $g^2$ and $g^3$. It is also assumed that it is intended to reverse or start rearwardly, as is indicated by the position of the handle 8 in alinement with the position marked R on the indicator 1, as shown in Fig. 2.

Referring to Fig. 3, it will be observed that the hook pawl $39^R$ is down upon the recess of the bar $B^{R-1}$ and is engaged with an adjacent shoulder. Referring to Fig. 4, it will be observed that the front of the slide 46 is engaged with the rack 32, which is shown to be in its extreme frontward position, and the hook of the lever 48 is in alinement with the high surface of the cam plate 50, while the rack 33 is in its extreme rearward position.

Referring to Fig. 5, it will be observed that the free end of the lever $28^R$ is down upon one of the recesses 26 of the interlock. Referring to Fig. 7, it will be observed that the lug 31 of said lever $28^R$ is in position to ride on top of the pawl hook $39^R$.

From the above it will be understood that, if the rod 51 be forced rearwardly, the slide 46 will force the rack 32 with its carriers 36 rearwardly, and the pinion 34 will force the rack 33 with its carriers 37 frontwardly. As the pawl hooks are normally held in their elevated positions by the springs 44, they do not transmit any motion to the shifter bars except the pawl hook $39^R$ which is forced to engage the bar $B^{R-1}$ by the lug of the lever $28^R$ riding on top of said pawl hook. The rearward movement of the carriers 36 will thus be transmitted to the bar $B^{R-1}$ to cause its shifter 18 to force the gear R—1 in mesh with the idler of the gear $g^R$.

The extreme rearward movement of the rod 51 is made to coincide with the position of the shifted gear when it is properly in mesh with the transmitting gear, and corresponds with the extreme rearward movement of the rack 32 with its pawl carriers 36 actuated by the slide 46, and with the extreme frontward movement of the rack 33 with its pawl carriers 37 actuated by the pinion 34 which causes said rack 33 to move from its position under the cam plate 50 indicated by the dotted line and frontwardly past the hook of the lever 48.

When the movement of the rod 51 is reversed, the slide 46 is moved away from the rack 32 and the lever 48 is carried frontwardly with its hook sliding along the rack 33 until it is just ahead of said rack when it is actuated by the spring 49 to hook onto said rack. This corresponds with the extreme frontward movement of the rod 51, and during this movement there is no change in the relative positions of the shifter bars.

Assuming now that the crank 7 is turned from its position R on the indicator to the position N, this movement is transmitted from the shaft 4 to the shaft 13 by the gears 14, and from the shaft 13 to the shaft 16 by the gears 15 to cause the interlock to rotate in the direction of the arrow. During this movement, the free end of the lever $28^R$ is forced out of the recess of the interlock and onto the cylindrical periphery thereof, whereby said lever is caused to swing in a direction away from its adjacent lever $28^2$, and its lug 27 is forced off the top of its pawl. The pawl $39^R$ is thus released and its spring 44 causes it to swing with its hook off the shoulder of the bar $B^{R-1}$.

If the rod 51 be now moved rearwardly, then during the first half of its said rearward movement the rack 33 is actuated by the hook of the lever 48 to move with its pawl carriers into its extreme rearward position, in which position the cam plate 50 forces said lever to release the rack, and the rack 32 is actuated by the pinion 34 to move with its pawl carriers into its extreme frontward position in which position it is in contact with the side of the slide 46. During the aforesaid movement, the bar $B^{R-1}$ is forced to move from its extreme rearward position into a central position by the rod of the carriers 36, and the gear R—1 is forced out of mesh with the idler of the gear $g^R$ and moved into a neutral position in the direction of the gear $g^1$. During the last half of the rearward movement of the rod 51, the direction of motion of the racks is reversed, and as the hooks of the pawls are not engaged with any of the shifter bars, said bars are not disturbed and the gears remain in a neutral position.

The movement of the crank 7 into the position marked 1 coincides with the movement of the interlock which brings one of its recesses under the free end of the lever $28^1$, which free end is forced into it by the spring connecting its lever with the lever $28^2$, and the swing of the lever $28^1$ in the direction of the lever $28^2$ causes the lug of the lever $28^1$ to ride on top of the pawl $39^1$. From the above it will be understood that, with the selector handle in the aforesaid position, the gear R—1 is shifted from its neutral position into mesh with the gear $g^1$ during the last half of the rearward movement of the rod 51.

From the above description of the operation of the device, it will be readily understood that, when the selecting handle is moved from the indicated position 1 into an indicated position N, the gear R—1 is moved out of mesh with the gear $g^1$ during the first half of the rearward movement of the rod 51. If, however, the selecting handle be moved into the indicated position 2, the interlock will be moved with one of its recesses in alinement with the free end of the lever $28^2$, and the spring connecting said lever with the lever $28^R$ will force the lug of the lever $28^2$ on top of the pawl $39^2$ and cause it to swing with its hook down the recess of the bar $B^{2-3}$; and during the last half of the rearward movement of the rod 51, the said bar will be moved rearwardly and its shifter 18 will force the gear 2—3 into mesh with the gear $g^2$.

If the selector handle is moved into the indicated position 3, the interlock first forces the free end of the lever $28^2$ out of its recess and subsequently permits the free end of the lever $28^3$ to enter an adjacent recess, so that the pawl $39^2$ is released and the pawl $39^3$ is restrained by the lug of the lever $28^3$. If the rod 51 be now moved rearwardly, then during the first half of said rearward movement the bar $B^{2-3}$ is actuated to move frontwardly by the rod of the carriers 36 to force the gear 2—3 out of mesh with the gear $g^2$, and during the last half of said rearward movement the same bar is actuated by the pawl hook $39^3$ to continue in its said frontward movement and to force said gear 2—3 to become connected with the gear $g^3$.

Having thus described my improved device, what I claim as new and desire to protect by Letters Patent, is—

1. In combination with a machine provided with speed changing elements, means for shifting said elements, a pair of racks and a pinion adapted to reciprocate the racks in opposite directions, means for selectively connecting the racks with the shifting means, and means for indicating the selections.

2. In combination with a machine provided with speed changing elements and with shifters each adapted to move one of the elements from a neutral into either one of two speed changing positions, members adapted to actuate the shifters, and a speed selector comprising means to indicate a contemplated change of position and the nature of the change and means to establish a selective connection between an actuating member and a shifter, corresponding to such contemplated position and means to shift said actuating members.

3. A speed selecting indicator comprising, a stationary member and a movable member, said stationary member provided with a periphery comprising the arcs of a series of interconnected segments of circles of alternately larger and shorter radius, the arc of each segment being provided with an intermediate notch, said movable member provided with means yieldably connected therewith and adapted to roll over the periphery of the stationary member.

4. A speed selecting indicator comprising, in combination with a pair of elements each adapted to be moved from an inactive into two speed changing positions, a stationary member provided with a periphery consisting of a series of interconnected arcs of circles of alternately larger and shorter radius, each arc provided with a recess, and a member movable over said periphery, said movable member provided with means adapted during its movement to register with said recesses to indicate a preselected change in the positions of the elements and to roll over the periphery, the movement from an arc of larger radius to that of a shorter radius indicating a selection of a change from a speed changing into an inactive position and vice versa.

5. In combination with a machine provided with speed changing elements and with a pair of shifters each adapted to move an element from a neutral position into either one of two speed changing positions, a pair of actuating members to each shifter adapted to be selectively engaged therewith to actuate the elements into a neutral position, means carried by said members adapted to become selectively engaged with the shifters to move the elements into their speed changing positions, and a speed selector comprising means adapted to indicate the various positions of each element, whether neutral or speed changing, and also to indicate a preselected change of position.

6. In combination with a machine provided with speed changing elements and with a pair of shifters each adapted to move an element from a neutral position into speed changing positions, actuating members each adapted normally to actuate a shifter to move an element into said neutral position, and a speed selector comprising means to indicate said positions, means to select the positions and means adapted to bring the actuating members into engagement with the shifters operatively connected with the selecting means.

7. In combination with a machine provided with speed changing elements and with shifters each adapted to move an element from a neutral position into either one of two speed changing positions, a pair of actuating members to each shifter each provided with means to actuate a shifter with its element into a neutral position, selective means adapted to cause the actuating members to actuate the shifters with their elements into speed changing positions, an interlock normally adapted to support the selective means in position of non-interference with the actuating members and also adapted to support said selective means in position to cause said actuating members to actuate the shifters with their elements into speed changing positions, and a speed selector comprising a member adapted to indicate the position of the elements and a member operatively connected with the interlock adapted to select said position.

8. In combination with a pair of coöperating elements of a speed changing device, a speed selector comprising a member adapted to indicate the coöperative and non-coöperative position of said elements, a member adapted to select the relative positions of said elements, and an interlock normally adapted to prevent the change from the non-coöperative into a coöperative position and operatively connected with the selecting member to permit of said change of position.

9. In combination with an element of a speed changing device adapted to be moved from a neutral position into a speed changing position, a speed selector comprising a member adapted to indicate said positions, a member for selecting a change of position, and an interlock movable by the selecting member in opposite directions and adapted to cause the movement of the element into its neutral position to precede its movement into its speed changing position.

10. In a gear shifting mechanism, the combination of shifters, a pair of actuating members to each shifter to move its shifter selectively in a given direction, means for connecting said members with the shifters to move the shifters in an opposite direction, means for selecting the connection of said parts, means to indicate the selected change of connection, and an interlock movable by the selecting member in opposite directions and adapted to prevent any other except the selected change in the connecting means.

11. In combination with a speed changing device provided with an element adapted to be moved from a neutral into a speed changing position, and a speed selector comprising a member adapted to indicate said positions and a member adapted to select the positions, shifting means, and means movable by the selecting member transversely of said shifting means in opposite directions adapted to selectively connect said element with said shifting means.

12. In combination with a speed changing device provided with an element adapted to be moved from a neutral position into one of two speed changing positions, a speed selector comprising a member adapted to indicate the positions and a member adapted to select the positions, levers provided with lugs 31 adapted to constrain the movement of the element into a speed changing position operatively connected with the selecting member.

13. In combination with a speed changing device of a machine provided with a pair of elements each adapted to be moved from a neutral position into speed changing positions, a speed selector comprising a member adapted to indicate the positions of each element and a member adapted to select a change of position, restraining means movable transversely of the elements each adapted to constrain the movement of an element into a speed changing position, and means movable by the selecting member in opposite directions adapted to establish a selective operative connection between the restraining means and the elements.

14. In combination with a machine provided with speed changing elements each adapted to be moved from a neutral position into speed changing positions, a speed selector comprising a member adapted to indicate the positions of each element and a member adapted to select a change of position, a pair of restraining members to each element normally adapted to prevent the movement thereof into a speed changing position, and means operatively connecting selecting member with the restraining members to selectively constrain the movement of the elements into speed changing positions.

15. In combination with a machine provided with speed changing elements each adapted to be moved into more than one speed changing position, a selector provided with a member to indicate the position of each element and a member to select a change of position, means adapted to constrain the movement of an element into a speed changing position, and an interlock operatively connected with the selector adapted to establish a selective operative connection between the constraining means and the elements.

16. In combination with a machine provided with an element adapted to be moved from a neutral into a speed changing position, an actuating member normally adapted to actuate said element into its neutral position and to prevent it from changing its position, a speed selector comprising a member adapted to indicate the position of the element and a member adapted to select a change of position, and means comprising an interlock and selectively operated levers operatively connecting the selecting member with the actuating member to cause it to actuate the element from its neutral into its speed changing position.

17. In combination with a machine provided with an element adapted to be moved from a neutral position into either one of two speed changing positions, a pair of actuating members normally adapted to cause the movement of the element into its neutral position and provided with means adapted to cause them to actuate the element into its speed changing positions, a speed selector comprising a member to indicate the positions of the element and a member adapted to select said positions, and means adapted to establish a selective operative connection between the selecting member and the actuating members.

18. In combination with a machine provided with speed changing devices, a shifter therefor, an actuating member movable longitudinally of the shifter in opposite directions, means carried by said member adapted to move the shifter in a given direction, said member being then adapted to move the shifter in an opposite direction, a speed selector, and means adapted to establish a selective operative connection of the member and the means carried by said member with the shifter.

19. In combination with a machine provided with speed changing elements, a shifter therefor, two members movable longitudinally thereof in opposite directions, and adapted to selectively engage and move the shifter, means carried by said members adapted to be selectively connected with the shifter, and means adapted to make said connections selective.

20. In combination with a machine provided with speed changing elements and with means for shifting said elements, a slide 46 adapted to become operatively connected with each shifter, and a speed selector comprising a member adapted to indicate the speed and a member adapted to select the speed, and means adapted to be operated by the selector to establish a selective connection between the slide and the shifters.

21. In combination with a machine provided with a speed changing element, a slide 46, a speed selector, and means adapted to operatively connect the slide with the selector.

22. In combination with a machine provided with a speed changing element, a slide 46 adapted to reciprocate said element, and a speed selector comprising a member adapted to indicate the speed and a member adapted to select the speed, and means adapted to operatively connect the selecting member with the slide.

23. In combination with a machine provided with speed changing elements, a normally disconnected slide 46 adapted to alternately shift each of said elements, and a speed selector comprising a speed indicating member and a speed selecting member, and means adapted to establish a selective operative connection between the selecting member and the slide.

24. In combination with a machine provided with speed changing elements, a slide 46, a lever yieldably connected therewith, and a speed selector comprising a speed indicating member and a selecting member, and means adapted to establish a selective operative connection of the elements with either the slide or with its lever.

25. In combination with a machine provided with speed changing elements, racks adapted to become operatively connected with said elements, a slide adapted to bear against the abutment of one of the racks and a lever yieldably connected with the slide adapted to bear against the abutment of another rack, and a speed selector comprising a speed indicating member and a selecting member, and means operatively connected with the selecting member adapted to establish a selective operative connection between the racks and the elements.

26. In combination with a machine provided with speed changing elements, a pair of racks, a slide adapted to actuate one of the racks, a lever movably connected with the slide adapted to actuate the other rack, a plate adapted to prevent the lever from actuating its rack, and a speed selector comprising a speed indicating member and a speed selecting member, and means operatively connected with the selecting member adapted to establish a selective operative connection between the racks and the elements.

27. In combination with a machine provided with speed changing elements, shifters operatively connected with said elements, a pair of racks, means for actuating the shifters pivotally mounted on said racks, and a speed selector comprising an indicating member and a selecting member, said selecting member being adapted to establish a selective operative connection between the shifters and the actuating means.

28. In combination with a machine provided with a speed changing element, a shifter operatively connected with said element, a pair of racks, means for actuating the shifters pivotally mounted on said racks, and a speed selector adapted to establish a selective operative connection between the actuating means and the shifter.

29. In combination with a machine provided with a speed changing element, a shifter therefor provided with a slot and with a shoulder, a rod projected through the slot of the shifter, an actuating member carried by the rod to float along the shifter and provided with means adapted to become engaged with the shoulder, a speed selector and means operatively connected therewith adapted to establish a selective engagement between the actuating member and the shifter.

30. In combination with a machine provided with an element adapted to be moved from a neutral position into speed changing positions, a shifter operatively connected therewith provided with a pair of slots and with a recess centrally between the slots, a pair of actuating members adapted to become alternately engaged with the shifter on opposite sides of the recess and to float in opposite directions along the slots, a speed selector, and means operatively connected therewith adapted to establish a selective operative connection between the actuating members and the shifters.

31. In combination with a machine provided with speed changing elements, shifters therefor, two members movable longitudinally thereof in opposite directions, means carried by said members for connecting them with the shifters, said means being normally disconnected from the shifters, means for connecting said members with the shifters to move said shifters in a given direction, said shifters being then adapted to be moved by the members in an opposite direction, and means adapted to selectively control the connecting means.

32. In combination with a machine provided with speed changing elements, a pair of shifters, a pair of racks movable longitudinally of the shifters in opposite directions, means carried by said racks for connecting them with the shifters, said racks being normally disconnected from said shifters, means adapted to actuate the connecting means to connect the racks with the shifters to move said shifters in a given direction, said shifters being then adapted to be moved by the racks in an opposite direction, and means adapted to make the connections selective.

33. In combination with the speed changing element of a machine, a floating lever adapted to actuate the element into a neutral position and provided with a hook adapted to actuate the element into a speed changing position and with a spring adapted to prevent the hook from so actuating the element, a speed selector, and means operatively connected therewith adapted to force the hook into its actuating position.

34. In combination with the speed changing element of a machine, means adapted to selectively actuate said element from a neutral into speed changing positions and comprising a pivoted hook provided with a bracket, a pivoted bolt slidingly supporting the bracket, a spring carried by the bolt normally adapted to prevent the movement of the hoop, a movably supported lug, a speed selector, and means operated by the selector adapted to move the lug into position to counteract the action of the spring upon the hook.

35. In combination with a speed changing element of a machine, means adapted to selectively actuate said element from a neutral into speed changing positions and comprising a pivoted hook provided with a cam surface, a speed selector, and means operated by said selector to ride upon the cam surface of the hook.

36. In combination with a speed changing element of a machine, means adapted to selectively actuate said element from a neutral into speed changing positions and comprising a floating lever, a lug normally supported alongside said lever, a speed selector, and means operated thereby to force the lug upon the lever.

37. In combination with a speed changing element of a machine, means adapted to selectively actuate said element from a neutral into speed changing positions and comprising a floating lever, a non-floating lever provided with means to swing the floating lever, a speed selector, and means operated thereby adapted to swing the non-floating lever.

38. In combination with a pair of floating levers, a pair of non-floating levers provided with means to swing the floating levers, a speed selector, and means operated thereby adapted to establish a selective operative connection between the non-floating and floating levers.

39. In combination with a set of floating levers, a corresponding set of non-floating levers, a speed selector, and means operated thereby adapted to establish a selective operative connection between the floating and non-floating levers.

40. In a speed selecting indicator, a stationary member, a crank member, a pair of yieldably connected levers, an interlock interposed between said levers normally adapted to prevent the yielding of said levers and provided with a recess adapted to cause either one of the levers to yield in the direction of the other, and means operatively connecting the interlock with the crank member.

41. In a speed selecting indicator, a stationary member, a crank member, a pair of oppositely pivoted levers, an interlock normally adapted to prevent the relative displacement of said levers and provided with a recess adapted to cause the displacement of either one of the levers, and means operatively connecting the crank member with the interlock.

42. In combination with a speed selecting indicator, a stationary member and a crank member, a set of levers arranged in oppositely pivoted pairs, the levers of each pair adapted to yield in opposite directions, an interlock normally adapted to prevent the relative displacement of the levers and provided with staggered recesses adapted to permit of a selective displacement of said levers, and means operatively connecting the interlock with the crank member.

43. In a speed selecting indicator, a set of levers arranged in oppositely pivoted pairs, each pair being yieldably interconnected, a pair of disks normally adapted to aline the levers transversely and longitudinally, said disks provided with staggered recesses, and means for moving the disks with their recesses in position to cause a relative selective displacement of said levers.

44. In a speed selecting indicator, comprising a stationary member and a crank member, a set of levers, a perforated plate supporting the levers, each lever provided with a lug projecting through a corresponding perforation of the plate, said levers being arranged in pairs and a spring connecting each pair transversely, means normally adapted to prevent the levers of a pair from yielding, and means operatively connecting the preventive means with the crank member.

45. In a speed selecting indicator comprising a stationary member and a crank member, a set of levers, a plate provided with two pairs of oppositely disposed pivots for the levers, a pair of rigidly joined disks normally adapted to prevent the relative displacement of the levers, said disks provided with staggered recesses, adapted to cause a relative displacement of said levers, and means operatively connecting the disks with the crank, adapted to make said displacement selective.

In testimony whereof I have signed this specification in the presence of two subscribing witnesses.

JOHN H. STORTZ.

Witnesses:
 NELSON D. WARWICK,
 CARRIE E. HAUBERT.